United States Patent [19]

Roll

[11] Patent Number: 4,659,932
[45] Date of Patent: Apr. 21, 1987

[54] APPARATUS FOR INTERLACING INFRARED ENERGY

[75] Inventor: Walter F. Roll, Blue Ridge, Tex.

[73] Assignee: Texas Instruments Incorporated, Dallas, Tex.

[21] Appl. No.: 728,627

[22] Filed: Apr. 29, 1985

[51] Int. Cl.⁴ .............................................. G02B 26/10
[52] U.S. Cl. .................................... 250/347; 250/334; 350/6.6
[58] Field of Search ............... 250/353, 347, 348, 334, 250/330; 350/6.6, 6.5

[56] References Cited

U.S. PATENT DOCUMENTS

| 3,742,238 | 6/1973 | Hoffman, II | 250/332 |
| 4,266,124 | 5/1981 | Weber et al. | 250/221 |
| 4,317,611 | 3/1982 | Petersen | 350/6.6 |

FOREIGN PATENT DOCUMENTS 750415  7/1980  U.S.S.R. ................................ 350/6.6

*Primary Examiner*—Janice A. Howell
*Assistant Examiner*—Constantine Hannaher
*Attorney, Agent, or Firm*—Richard K. Robinson; Leo N. Heiting; Melvin Sharp

[57] ABSTRACT

A radiant energy interlace system comprises an electromagnetic radiant energy reflector means having a magnetic core which includes a reed mirror portion and a body portion. The reed mirror portion is either a polished plate or frame of magnetic material holding a mirror and the body portion is of magnetic material having a center section with a centrally disposed ridge from which downwardly sloping surfaces extend to solid bar reel sections surrounded by coils of conductive wire. End sections of magnetic material having sloping surfaces for continuing the sloping surface of the center section complete the body section. A circuit is connected to the coils for alternately energizing the coils to magnetize alternate portions of the reed mirror portion to rotate the reed mirror portion about the fulcrum ridge of the center section. The slope of the body portion surfaces is equal to one half of the desired interlace angle.

8 Claims, 2 Drawing Figures

APPARATUS FOR INTERLACING INFRARED ENERGY

This invention relates to infrared devices and more particularly to an improved infrared scanner system.

In the past, infrared receivers have consisted of a lens assembly for receiving and focusing infrared energy emanating from a scene, a scanning assembly for scanning the incoming infrared energy across a detector array and a signal processor for processing the electrical output of the detector array into video signals for display.

The scanning assemblies have included a mirror having a single or double face. A single faced mirror is used in systems where, for example, visible displays are not required and a double faced mirror is used to synchronize the visible light display scan with the infrared energy scan. The mirror is mounted within a first gimbal for movement in a first direction, generally in a horizontal direction for scanning a scene and the first gimbal is mounted within a second gimbal for movement in a second direction, generally in a substantially vertical direction for interlacing. Thus, the horizontal movement scans the focused infrared energy across a vertical array of infrared detectors to produce a first field, and then the vertical movement positions the mirror with respect to the array of detectors to produce a second field for a 2:1 interlace pattern. Thus, such interlacing in effect doubles the size of the detector array.

The gimbals are moved, for example, by servo motors or solenoids. Those persons skilled in the art desiring more information about prior art devices are referred to U.S. Pat. No. 3,742,238 issued June 26, 1973. The above described prior art devices are bulky and expensive owing to the number of parts required in the scanning and interlace mechanisms. Thus, their use in many applications has been restricted where either space is at a minimum or cost is prohibitive for the intended application or both. Further, such prior art devices require adjustments, thus increasing maintenance requirements.

Accordingly, it is an object of this invention to provide an interlace system having a substantially reduced parts requirement and cost.

Another object of the invention is to provide a substantially maintenance free interlacer system.

Briefly stated the invention comprises an electromagnetically controlled interlace mirror scan system for an infrared detection device.

Other objects and features of the invention will become more readily apparent from the following detailed description when read in conjunction with the accompanying drawings, in which.

Figure 1:
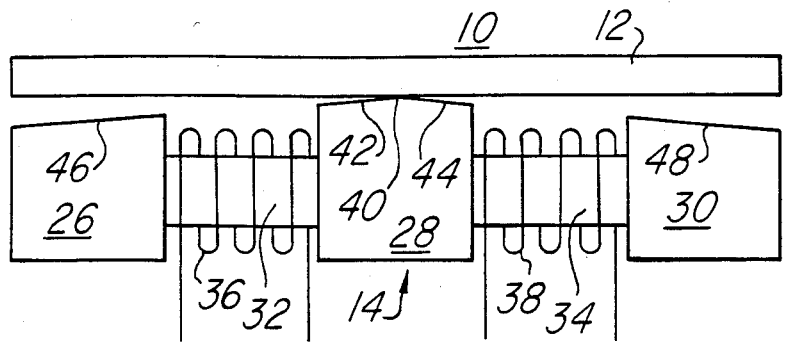
FIG. 1 is a tap view of the infrared interlace scanner mechanism constituting the subject matter of the invention.

Referring now to FIG. 1, the infrared interlace scanner mechanism 10 comprises an iron reed mirror 12, a coil bobbin 14, a pair of electrical coils 32 and 34 and a housing (not shown). The bobbin and electrical coils and reed mirror form an electromagnet with the surfaces of the bobbin shaped as hereinafter described to provide, when activated by a source of power, an interlace scanning rotation of the reed mirror.

The reed mirror 12 may also be, for example, a polished plate of soft steel or a glass mirror mounted in a soft steel frame.

The coil bobbin 14 comprises a core of magnetic material such as, for example, soft steel or a rust proof magnetic material. The core has three blocks 26, 28 and 30 spaced by solid bar reels 32 and 34. Coils 36 and 38 of conductive wire are wound on the reels 32 and 34. Block 28 of the core has a centrally disposed ridge 40 which serves as a fulcrum for the reed mirror 12 and sloping surfaces 42 and 44 extending downwardly at an angle equal to one half the angle of rotation desired for the reed mirror. The surfaces 46 and 48 of blocks 26 and 30 form extensions of the angular surfaces of the central block 28. The housing includes a cup shaped member whose walls receive a reed mirror retaining plate (not shown). Inasmuch as the reed mirror is retained against the coil bobbin surfaces during operation, the retaining plate is supported by the walls above the reed mirror an amount to clear the reed mirror during its operation, but close enough to retain the reed mirror during power off.

It will be appreciated by those skilled in the art that the above described scanning mechanism is positioned with the ridge 40 transverse to the desired interlace scanning motion. Those persons skilled in the art will readily recognize also that for a two faced mirror mechanism, the interlace scanner mechanism is positioned to coact with the frame without obstructing the mirror.

Figure 2:
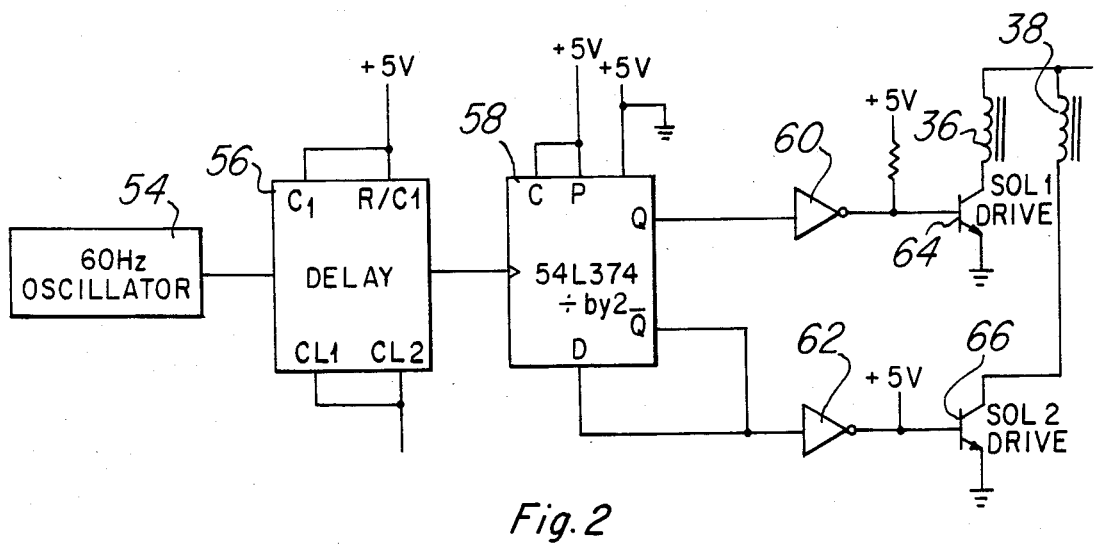
FIG. 2 is a schematic diagram of the electrical circuit for the scanner mechanism.

Referring now to FIG. 2, the coil driving electrical circuit includes an oscillator 54, a delay circuit means 56 connected to the oscillator, a divide by two circuit means 58 connected to the delay circuit means, power inverters 60 and 62 connected to the divide by two circuit means and a pair of solid state switches 64 and 66 connected to the inverters 60 and 62, respectively. The switches 64 and 66 are connected to the coils 36 and 38 of the scanner/interlace mechanism (FIG. 1).

The oscillator 54 is that of the infrared system to provide the necessary synchronization between the scanner operation and infrared system operation of which the scanner is a part. The delay circuit means 56 is, for example, a 54LS221 integrated circuit for delaying scanner operation during dead time. The divide by two circuit means 58 is a 54LS74 integrated circuit which outputs a positive (Q) signal and a negative (Q) bar signal. Inverters 60 and 62 invert the outputs of the divide by two circuit means and apply them to the bases of transistors 64 and 66. Thus, when a logic high signal is received at the base of transistor 64, transistor 64 turns on and power flows through the coil 36, simultaneously therewith transistor 66 receives a low signal and turns off and no power is admitted to coil 38. Conversely, when a low signal is received at the base of transistor 64, transistor 64 turns off and transistor 66 turns on to power coil 38 only.

In operation, when coil 36 is activated, coil 38 is inactivated and the reed mirror is drawn to the surfaces 42 and 46 of blocks 28 and 26 by the magnetic force generated. Conversely, when coil 38 is activated coil 36 is inactivated and the reed mirror 12 is drawn to the surfaces 44 and 48 of blocks 28 and 30. In this manner the reed mirror is rotated for interlacing the incoming infrared energy onto the detector array. The air trapped between the surfaces 42, 44, 46 and 48 and the reed mirror 12 during operation dampens the force of impact between the surfaces and the reed mirror to provide a long mean time before failure and a quiet operation.

Although several embodiments of this invention have been described, it will be apparent to a person skilled in the art that various modifications to the details of construction shown and described may be made without departing from the scope of this invention. For example, one of the coils can be replaced by a spring for returning the reed mirror portion upon inactivating the remaining coil.

What is claimed is:

1. An apparatus for interlacing infrared energy comprising: an electromagnetic radiant energy reflector means including a core of magnetic material, said core of magnetic material having a body portion and a mirror reed portion, said body portion forming a fulcrum in operative association with a central portion of the mirror reed portion and a coil surrounding a portion of the body portion of the core on either side of said fulcrum so that when the coil is selectively energized, the mirror reed portion is selectively rotatable in two preselected scan directions relative to said fulcrum.

2. An apparatus for interlacing infrared energy comprising: an electromagnetic radiant energy reflector means including a core of magnetic material, said core of magnetic material having a body portion and a mirror reed portion, the body portion of the core of magnetic material including a central body portion, two reel portions and two end portions, the end portions separated from the central body portion by the reel portions, a coil of conductive material surrounding each reel, and circuit means for energizing the coils, said central body portion having a centrally disposed fulcrum forming ridge with downwardly sloping surfaces on opposing sides of the ridge and said end portions having surfaces forming coplanar continuations of the downwardly sloping surfaces of the central body portion so that when the coils are energized to magnetize portions of the core, the mirror reed portion rotates about the fulcrum within the scan limits defined by the downwardly extending surfaces of the central body portions and of the end portions with the said surfaces coacting with the reed mirror portion and air trapped there between to provide a damper for deadening the engagement of the reed mirror portion with the body portion.

3. An apparatus for interlacing infrared energy according to claim 2 wherein the circuit means includes a divide by two circuit and two solid state switches operatively connected to the divide by two circuit for alternately energizing the coils of the body portion for magnetizing the corresponding sides of the core opposite the ridge to rotate the reed mirror about the ridge.

4. An apparatus for interlacing infrared energy according to claim 2, further including means to energize said coils simultaneously in opposite directions so that portions of said mirror reed portion disposed on opposite sides of said fulcrum have a force directed thereon in the same direction.

5. An apparatus for interlacing infrared energy according to claim 4 wherein the reed mirror portion is a plate of magnetic material having a polished surface acting as a mirror.

6. An apparatus for interlacing infrared energy according to claim 4 wherein the reed mirror portion is a plate of magnetic material having a polished surface acting as the interlacing mirror for the infrared energy.

7. An apparatus for interlacing infrared energy according to claim 4 wherein the reed mirror portion of the core includes a frame of magnetic material and a mirror mounted in said frame, said frame in operative association with the body portion of the core for providing the interlace scan.

8. An apparatus for interlacing infrared energy according to claim 4 wherein the circuit means includes a divide by two circuit and two solid sate switches operatively connected to the divide by two circuit for alternately energizing the coils of the body portion for magnetizing the corresponding sides of the core opposite the ridge to rotate the reed mirror about the ridge.

* * * * *